(No Model.)

T. A. SIMONS.
COOKING UTENSIL.

No. 478,243. Patented July 5, 1892.

Witnesses
H. B. Bradshaw.
J. H. Travel.

Inventor
Thomas A. Simons
By his Attorneys
Staley and Shepherd

UNITED STATES PATENT OFFICE.

THOMAS A. SIMONS, OF COLUMBUS, OHIO.

COOKING UTENSIL.

SPECIFICATION forming part of Letters Patent No. 478,243, dated July 5, 1892.

Application filed August 28, 1891. Serial No. 403,978. (No model.)

*To all whom it may concern:*

Be it known that I, THOMAS A. SIMONS, a citizen of the United States, residing at Columbus, in the county of Franklin and State of Ohio, have invented a certain new and useful Improvement in Cooking Utensils, of which the following is a specification.

My invention relates to the improvement of cooking utensils, and has particular relation to baking and roasting pans.

The objects of my invention are to provide a simple, neat, and convenient form of cooking utensils of this class of such construction as to admit of its upper portion being partially or wholly unclosed or opened, as desired, for inspection of the contents; to so construct and arrange the upper portion or section of my device as to prevent the steam inclosed thereby from coming into contact with the hands of the person opening or raising the same; to form with the pan-bottom such supports as will admit of the heated air circulating beneath the body of the pan, and to produce other improvements more specifically pointed out hereinafter. These objects I accomplish in the manner illustrated in the accompanying drawings, in which—

Figure 1:
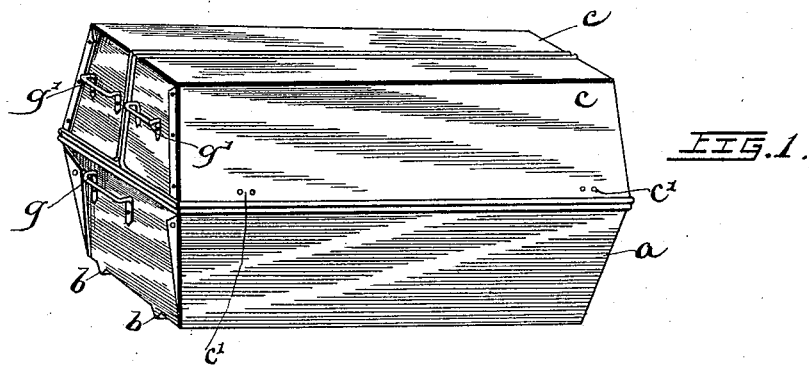
Figure 2:
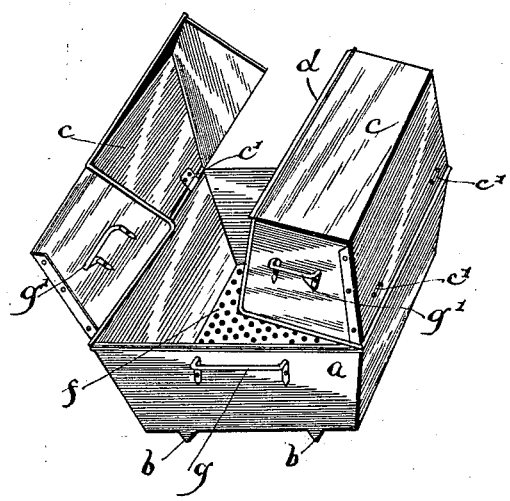
Figure 3:
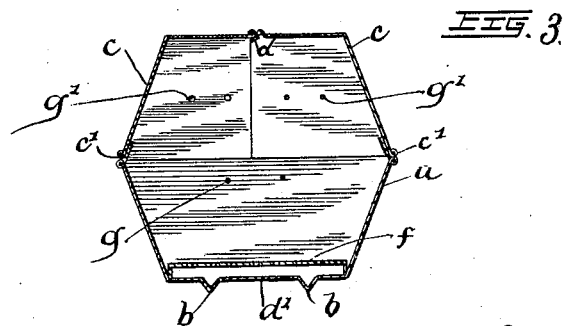

Figure 1 is a perspective view of my device when closed. Fig. 2 is a similar view showing the upper or cover sections partly swung open. Fig. 3 is a cross-section of the same when closed.

Similar letters refer to similar parts throughout the several views.

$a$ represents the body of my improved cooking utensil, which has the general form of a pan, the sides and ends of which are slightly flaring from the base or bottom $a'$ thereof. This base or bottom plate is, as shown, provided throughout its length with two or more depressions, resulting in the formation therein of longitudinal ribs $b$, which support the bottom $a'$ from the oven-plate or other plane upon which the pan rests.

To the upper edges of each of the longer sides of the body $a$ I hinge at $c'$ a cover-section $c$, which in form corresponds with an inverted half-section of the lower pan or body to which it is hinged. These cover-sections $c$ are dropped inwardly in such position that their lower edges abut against and rest upon the upper edges of the pan-body $a$ and their inner edges meet and form, as shown in Figs. 1 and 2 of the drawings, a complete cover for the pan. As shown at $d$, one of the sections $c$ is provided on its upper and inner edge with a longitudinal projecting lip, which is adapted to form a support for the rounded corresponding edge of the remaining cover-section when the two are brought together, as described. As shown in the drawings, the edges of the pan-body and cover-sections are preferably made to inclose or are bound by suitable strengthening-wires.

$f$ represents a perforated supporting-plate the sides of which are flanged downward and made to bear upon the bottom $a'$ of the body $a$. As shown at $g$, each end of the body $a$ is provided with a suitable projecting handle-piece, while similar handle-pieces $g'$ are made to project from the ends of the cover-sections $c$.

From the construction herein shown and described it will be seen that one or both of the cover-sections may be raised from the pan-body for the purpose of inspecting or testing the contents while cooking, and that these cover-sections and the handles therefor are so arranged as to prevent the steam or hot vapor which may have been inclosed within the pan from coming into contact with the hands of the person raising the covers. It will thus be seen that by my construction the cover-sections may be turned to one side of the pan in such position as to give easy access to the whole of the latter without in any manner obstructing or conflicting with the operation of depositing or removing the pan's contents.

As will readily be seen, my improved baking and roasting device will serve when closed to retain the vapors generated in cooking, which, as is well known, not only greatly aids in the production of uniform cooking action on the contents of the pan, but prevents the escape of the volatile parts of the substance being cooked.

Owing to the construction of the pan-bottom, as herein described, it will be seen that the greater portion of said bottom will be elevated from the oven-plate upon which it may be supported, and thus admit of the circulation of hot air beneath said pan.

It will be observed that the construction of my cooking device is neat and simple and is such as to admit of easy access to the interior when desired.

I am aware that cooking utensils of this class have been formed heretofore wherein a pan having a hinged cover has been employed; but my invention differs from these in the combination of parts set forth in the claim.

Having now fully described my invention, what I claim, and desire to secure by Letters Patent, is—

In a cooking utensil, the combination, with the pan or body $a$ and the longitudinal supporting-ribs projecting from the bottom thereof and formed therewith, of the cover-sections $c$, hinged, as described, on opposite sides of said pan-body and adapted to be made to meet centrally above the latter, a rounded edge on one of said cover-sections and a projecting lip on the other, said lip adapted to form a seat for said rounded edge, and handles $g'$, projecting, as described, from the closed ends of said cover-sections, substantially as and for the purpose specified.

THOMAS A. SIMONS.

In presence of—
C. C. SHEPHERD,
ELMER E. LEGG.